United States Patent
Head

[11] Patent Number: 6,148,865
[45] Date of Patent: Nov. 21, 2000

[54] BRAIDED SLEEVE, TUBULAR ARTICLE AND METHOD OF MANUFACTURING THE TUBULAR ARTICLE

[75] Inventor: Andrew Atkins Head, Cincinnati, Ohio

[73] Assignee: A & P Technology, Inc., Covington, Ky.

[21] Appl. No.: 08/759,255

[22] Filed: Dec. 2, 1996

[51] Int. Cl.[7] .................................................. F16L 11/00
[52] U.S. Cl. .......................................... 138/123; 138/124
[58] Field of Search ........................ 428/102; 285/334.1; 29/446; 156/294; 42/76.02; 138/126, 123, 124, 125, 153

[56] References Cited

U.S. PATENT DOCUMENTS

| | | | |
|---|---|---|---|
| Re. 28,155 | 9/1974 | Dow | 139/383 R |
| 1,473,427 | 11/1923 | Handley . | |
| 2,009,075 | 7/1935 | Thompson | 137/90 |
| 2,114,274 | 4/1938 | Huppert | 96/26 |
| 2,396,483 | 3/1946 | Alderfer | 139/421 |
| 2,935,096 | 5/1960 | Cole | 139/387 |
| 3,442,738 | 5/1969 | Scott et al. | 156/161 |
| 3,625,809 | 12/1971 | Caroselli et al. | 161/91 |
| 3,862,878 | 1/1975 | Azuma | 161/58 |
| 3,896,206 | 7/1975 | Beaver et al. | 264/137 |
| 3,962,394 | 6/1976 | Hall | 264/257 |
| 3,974,012 | 8/1976 | Hogarth | 264/229 |
| 4,015,641 | 4/1977 | Goff, Jr. et al. | 139/384 R |
| 4,047,993 | 9/1977 | Bartelmuss | 156/89 |
| 4,055,201 | 10/1977 | Fowler et al. | 139/421 |
| 4,055,697 | 10/1977 | Schmanski | 428/113 |
| 4,191,219 | 3/1980 | Kaye | 139/383 R |
| 4,228,207 | 10/1980 | Porte et al. | 428/80 |
| 4,263,361 | 4/1981 | Hodes et al. | 428/240 |
| 4,283,446 | 8/1981 | McLain | 428/36 |
| 4,298,562 | 11/1981 | Latty | 264/103 |
| 4,380,483 | 4/1983 | Kliger | 156/169 |
| 4,380,523 | 4/1983 | Lind et al. | 264/257 |
| 4,389,269 | 6/1983 | Cooper et al. | 156/172 |
| 4,567,917 | 2/1986 | Millard | 138/126 |
| 4,629,225 | 12/1986 | Rowsey | 285/334.1 |
| 4,741,087 | 5/1988 | Plummer, Jr. | 29/446 |
| 4,754,685 | 7/1988 | Kite et al. | 87/9 |
| 4,756,942 | 7/1988 | Aichele | 428/102 |
| 4,771,518 | 9/1988 | LaPointe et al. | 28/143 |
| 4,774,043 | 9/1988 | Beckmann | 264/134 |
| 4,777,859 | 10/1988 | Plummer, Jr. | 87/7 |

(List continued on next page.)

FOREIGN PATENT DOCUMENTS

| | | |
|---|---|---|
| 0113196 | 7/1984 | European Pat. Off. . |
| 0134864 | 3/1985 | European Pat. Off. . |
| 2501579 | 9/1982 | France . |
| 2510624 | 2/1983 | France . |
| 2583072 | 12/1986 | France . |
| 62-117732 | 5/1987 | Japan . |
| 2-293434 | 5/1989 | Japan . |
| 1-286832 | 11/1989 | Japan . |
| 1044880A | 9/1983 | U.S.S.R. . |
| WO91/14034 | 9/1991 | WIPO . |
| WO92/06235 | 4/1992 | WIPO . |

*Primary Examiner*—Andres Kashnikow
*Assistant Examiner*—Davis Hwu
*Attorney, Agent, or Firm*—Darby & Darby

[57] ABSTRACT

A sleeve, a method of manufacturing a rigid, tubular article manufactured from the sleeve and an article made according to the method. The sleeve has elastic crisscrossing first and second filaments which enable the sleeve to be expandable in a radial direction and longitudinally extending filaments of a reinforcing non-elastic material such as carbon, kevlar or fiberglass to reinforce the sleeve. The sleeve is placed over a mandrel having alternating larger and small cross-sections. The sleeve is subjected to heat and pressure causing the individual filaments to fuse together forming a tubular part. Upon having cooled, the article is removed and a rigid tubular article, for example, a rifle scope tube is thereby formed. In an alternative embodiment, a sleeve is provided which in its relaxed state is contracted longitudinally and expanded radially. The sleeve is slipped into a pipe joint, for example, when in its stretched state and is then released. The sleeve is heated to fuse the sleeve and thereby reinforce the joint.

16 Claims, 2 Drawing Sheets

U.S. PATENT DOCUMENTS

| | | | |
|---|---|---|---|
| 4,907,624 | 3/1990 | Jonasson | 138/123 |
| 4,940,617 | 7/1990 | Baurmeister | 428/36.3 |
| 4,946,721 | 8/1990 | Kindervater et al. | 428/36.1 |
| 4,976,812 | 12/1990 | McConnell et al. | 156/148 |
| 5,000,228 | 3/1991 | Manent et al. | 138/124 |
| 5,013,507 | 5/1991 | Julien et al. | 264/219 |
| 5,028,464 | 7/1991 | Shigetoh | 428/35.9 |
| 5,048,441 | 9/1991 | Quigley | 156/173 |
| 5,057,092 | 10/1991 | Webster, Jr. | 604/282 |
| 5,100,713 | 3/1992 | Homma et al. | 428/102 |
| 5,108,533 | 4/1992 | Long, Jr. et al. | 156/294 |
| 5,125,179 | 6/1992 | Campbell et al. | 42/76.02 |
| 5,176,660 | 1/1993 | Truckai | 138/123 |
| 5,186,992 | 2/1993 | Kite, III | 428/36.3 |
| 5,217,770 | 6/1993 | Morris, Jr. et al. | 428/36.3 |
| 5,256,459 | 10/1993 | Carlson | 428/36.3 |
| 5,312,660 | 5/1994 | Morris et al. | 428/36.6 |
| 5,406,055 | 4/1995 | McGaffigan | 219/643 |
| 5,409,651 | 4/1995 | Head | 264/103 |
| 5,419,231 | 5/1995 | Earle, III et al. | 87/1 |
| 5,419,949 | 5/1995 | Marx et al. | 428/22 |
| 5,613,522 | 3/1997 | Ford et al. | 138/123 |

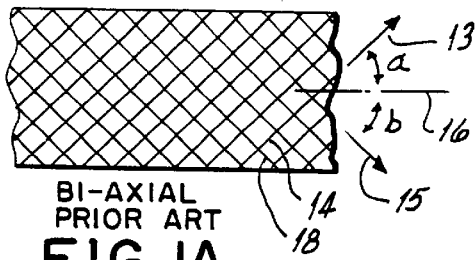
FIG. IA
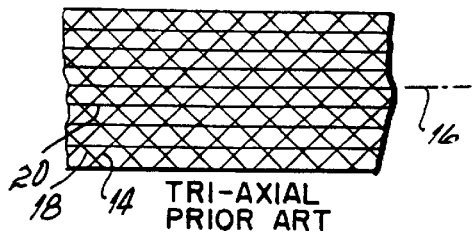
FIG. IB
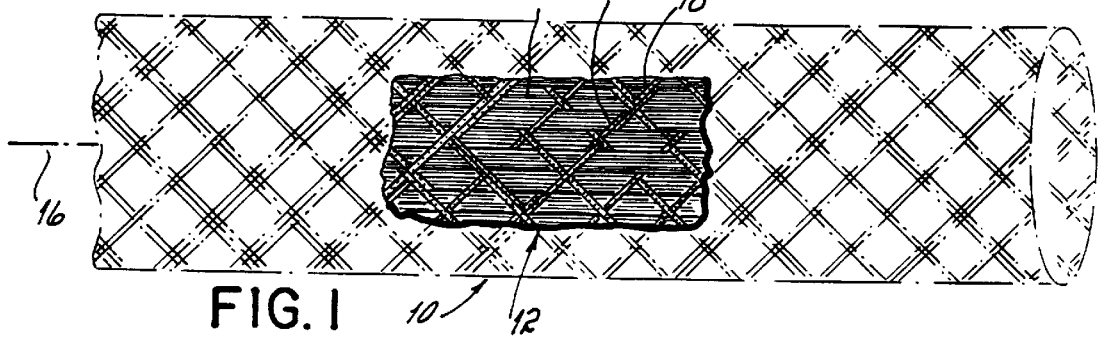
FIG. I
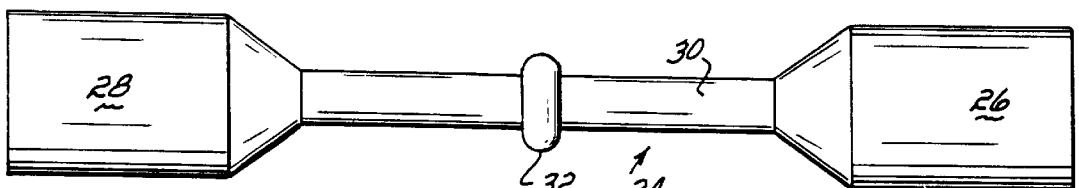
FIG. 2
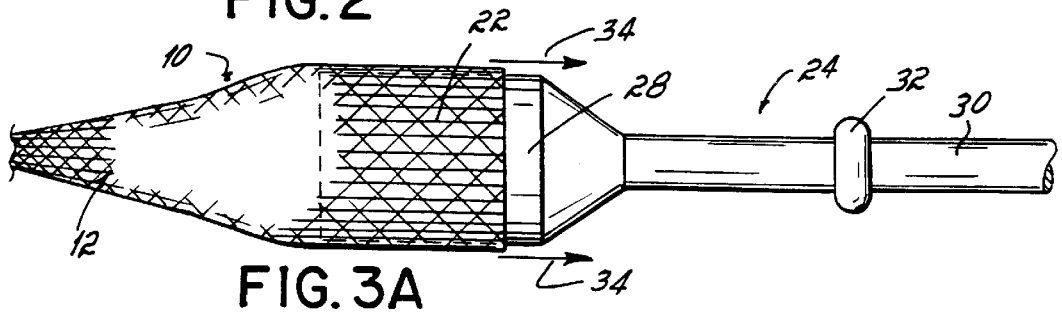
FIG. 3A
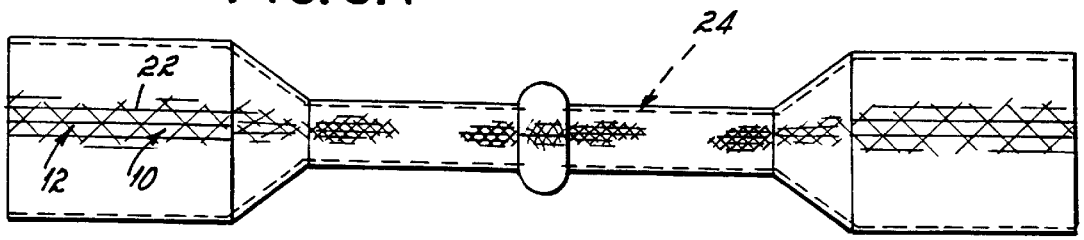
FIG. 3B
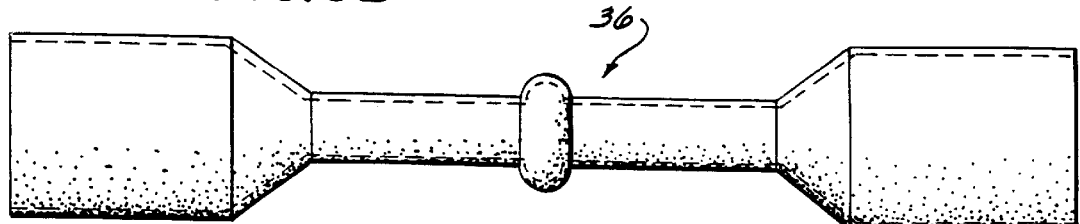
FIG. 4

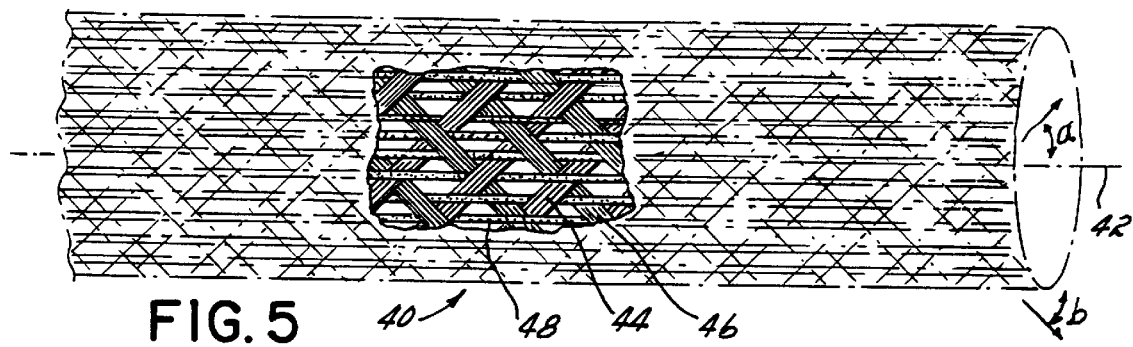
FIG. 5
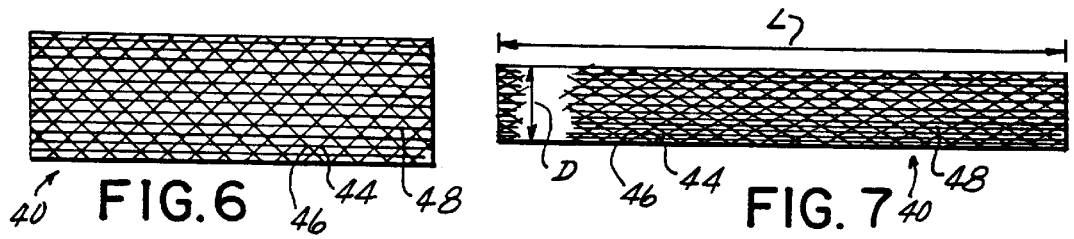
FIG. 6   FIG. 7
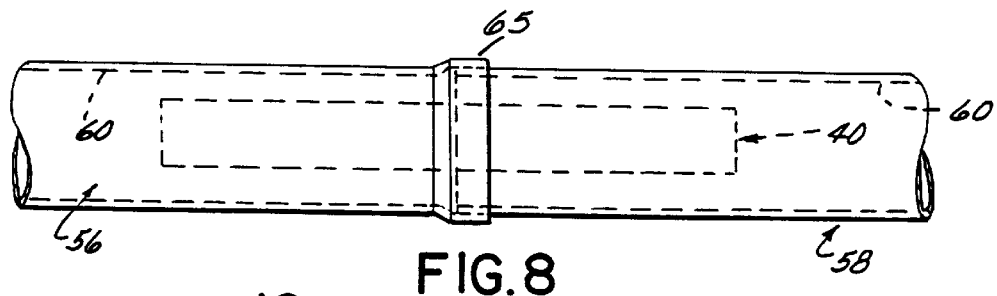
FIG. 8
FIG. 9
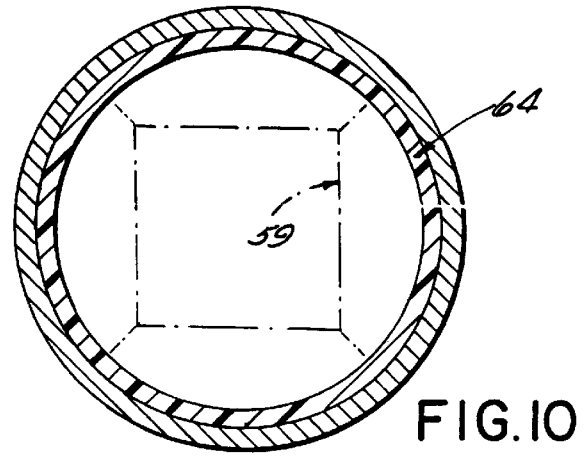
FIG. 10

BRAIDED SLEEVE, TUBULAR ARTICLE AND METHOD OF MANUFACTURING THE TUBULAR ARTICLE

FIELD OF THE INVENTION

This invention relates generally to forming articles of manufacture from braided sleeving and more particularly to manufacturing an article having varying cross-sections such as a rifle scope, for example.

BACKGROUND OF THE INVENTION

It is known in the industry to use braided sleeving to form rigid tubular parts. The braided sleeving is typically impregnated with a res in and then slipped over a mold or mandrel then subjected to heat and pressure to form a tubular part. The formed rigid tubular part is then removed from the mold or mandrel.

U.S. Pat. No. 5,409,651 issued to the assignee of the present application discloses a method of forming a tapered tubular part made from braided sleeving, the entire substance of which is hereby incorporated by reference herein as if fully set forth in its entirety. The braided sleeve is placed into a mold and then a tapered mandrel is inserted into the mold. Heat and pressure applied to the sleeve cause the filaments of the sleeve to fuse together. The sleeve is then cooled and a rigid tapered tubular part is removed from the mandrel. The sleeve may be bi-axial braid or tri-axial braid. Bi-axial braid comprises two groups of filaments which criss-cross one another and are interwoven together in an over, under pattern. Each filament is positioned at an angle to the longitudinal axis of the sleeve. This patent discloses the sleeving as being an over one under one diamond bi-axial braid pattern or a over two under two bi-axial braid pattern.

U.S. Pat. No. 4,774,043 also discloses the use of a bi-axial braided sleeve to form a reinforced plastic part by placing the sleeve over a mold and then impregnating the sleeve with settable plastic. The mold of this patent has a middle region having a relatively small or reduced diameter and two opposing end regions with a larger diameter than the middle region. The fibers which make up the sleeve are impregnated with a settable plastic which when heated and then cooled, hardens to form a fiber reinforced plastic part. This patent discloses a bi-axial braided sleeve and does not disclose the use of a tri-axial braided sleeve.

In addition to tubular sleeves being made out of bi-axial filaments extending in two different directions criss-crossing one another, tubular sleeves may also be made out of tri-axial braiding. Tri-axial braid is preferable to bi-axial braid because it produces a finished part which has mechanical properties, such as strength and stiffness, which are superior to that of a part produced from bi-axial braid. Tri-axial braid comprises first and second criss-crossing yarn filaments braided together as in a bi-axial braid but in addition, comprises longitudinally extending filaments which are braided into and out of the first and second criss-crossing filaments. Tri-axial braided sleeves are disclosed in U.S. Pat. Nos. 2,114,274 and 4,741,087. The longitudinal fibers or filaments are responsible for the increased quality of the mechanical properties.

One problem with tri-axial yarn is that it is not stretchable longitudinally and transversely to the longitudinal axis of the sleeve. On the other hand, bi-axial braided sleeving is stretchable both longitudinally and radially. If expanded longitudinally, a bi-axial braid will contract radially or if the bi-axial braided sleeve is expanded radially, it will contract longitudinally. Thus, bi-axial braid can be utilized to form tubular parts having varying cross-sections, i.e. alternatively smaller and larger cross-sections or diameters, because the bi-axial braid has the ability to expand and contract radially so as to conform to a mold of this shape. On the other hand, tri-axial braid does not have this ability.

Therefore, it would be desirable to combine the ability of bi-axial braid to conform to a mold having varying cross-sections with the superior mechanical properties of tri-axial braid.

Therefore, it has been one objective the present invention to provide a tubular braided sleeve of a tri-axial configuration which is expandable in a radial direction in order to be slipped over a mold of varying cross-sections.

It has been another objective of the present invention to provide a method of making a tubular part of differing cross-sections from this type of tri-axial braided sleeving.

It has been yet another objective of the present invention to provide an article of manufacture made from this type of tri-axial tubular braided sleeving.

SUMMARY OF THE INVENTION

The invention of this application which accomplishes these objectives comprises a braided sleeve comprising a plurality of criss-crossing interwoven elastic filaments extending in directions angled to the longitudinal axis of the braided sleeve and a plurality of non-elastic filaments extending parallel to the longitudinal axis of the sleeve. The non-elastic filaments are interwoven with the elastic criss-crossing filaments to form a sleeve which is expandable in a radial direction and which may be fitted over a mold or mandrel having varying cross sections, i.e. having alternating larger/smaller/larger cross-sections or smaller/larger/smaller cross-sections, such as is found in rifle scope tubes or the like. While on the mandrel, the sleeve is heated and pressed or pressurized to form a rigid tubular part of differing cross-sections.

The method by which the tubular article of manufacture of differing cross-sections is manufactured is to first provide a tubular braided sleeve having a longitudinal axis with elastic first and second filaments both extending at an angle to the longitudinal axis of the sleeve and a plurality of tows of reinforcement filaments which are non-elastic and extend generally parallel the longitudinal axis of the sleeve. Then the sleeve is stretched over a mandrel having the same general shape as the article of manufacture, i.e. having different cross-sections. The sleeve is expandable and contractible in a radial direction in order that it may snugly fit on the mandrel. While the sleeve is on the mandrel, the sleeve is subjected to heat and pressure fusing the filaments together. Then the sleeve is allowed to cool before the mandrel is removed resulting in a rigid tubular article of manufacture, for example a rifle scope tube.

The article of the present invention made from a tri-axial braid sleeve therefore comprises a plurality of first elastic filaments, a plurality of second elastic filaments and a plurality of non-elastic filaments. The first elastic filaments extend in a first direction at an angle to the longitudinal axis of the sleeve, the second elastic filaments extend in a second direction different from the first direction, the second direction also being at an angle to the longitudinal axis. The first and second filaments criss-cross one another and are interwoven with one another. The non-elastic filaments are generally grouped together in tows or groups of non-elastic filaments which extend generally parallel the longitudinal axis of the sleeve and are interwoven with the criss-crossing first and second elastic filaments. Upon heating and cooling the filaments fuse together and form a rigid part.

Alternatively, the first and second filaments of the sleeve may be made of a non-elastic material and the longitudinally extending filaments may be made of an elastic material so that they are longitudinally expandable and contractible. This alternative sleeve is used to reinforce a rigid tubular article of manufacture according to the following method. The tubular sleeve is placed inside a tubular article while the sleeve is longitudinally expanded and radially contracted. The ends of the sleeve are released causing the sleeve to contract longitudinally and expand radially so as to conform to the inner wall of the article. Then the sleeve is subjected to heat and pressure to fuse the sleeve to the inner wall of the article.

BRIEF DESCRIPTION OF THE DRAWINGS

FIG. 1A is a perspective view of a portion of prior art bi-axial braided sleeve having an over one under one pattern.

FIG. 1B is a perspective view of a portion of a prior art tubular tri-axial braided sleeve.

FIG. 1 is a side perspective view of a portion of a tri-axial braided sleeve in accordance with the present invention.

FIG. 2 is a side elevational view of a mandrel in the shape of an article of manufacture to be formed, for example a rifle scope.

FIG. 3A is a fragmentary side view of the sleeve of FIG. 1 being placed over the mandrel of FIG. 2.

FIG. 3B is a side elevational view of the sleeve of FIG. 1 placed over the mandrel of FIG. 2.

FIG. 4 is a side elevational view of the finished part manufactured according to the process of the present invention.

FIG. 5 is a fragmentary perspective view of an alternative embodiment of the tubular sleeve of the present invention.

FIG. 6 is a side elevational view of sleeve of FIG. 5 in its relaxed, longitudinally contracted and radially expanded state.

FIG. 7 is a side elevational view of the braided sleeve of FIG. 5 in its stretched, longitudinally expanded and radially contracted state.

FIG. 8 is a view of the expanded sleeve of FIG. 7 placed inside the juncture of two pipes or tubular parts.

FIG. 9 is a view of the sleeve of FIG. 7 in its relaxed state, radially expanded against the inner walls of the two pipes.

FIG. 10 is a view taken along the lines 10—10 of FIG. 9.

DETAILED DESCRIPTION OF THE DRAWINGS

Referring to FIG. 1, a braided sleeve 10 comprises a plurality of filaments interwoven with one another to form the braided sleeve. The filaments 12 may be interwoven in a bi-axial pattern as illustrated in FIG. 1A or a tri-axial pattern as illustrated in FIG. 1B. Referring to the bi-axial pattern of FIG. 1A, all of a plurality of first filaments 14 extend in one direction 13 parallel to one another at an angle alpha to the longitudinal axis 16 of the sleeve and a plurality of second filaments 18 extending in a direction 15 at an angle beta to the longitudinal axis 16 of the sleeve. In the bi-axial braid of FIG. 1A, the first filaments 14 and second filaments 18 criss-cross with one another and are interwoven together. FIG. 1 B illustrates a tri-axial braid having the identical first and second filaments as in the bi-axial braid of FIG. 1A but in addition having a plurality of longitudinally extending third filaments 20 which extend generally parallel to the longitudinal axis of the sleeve. The third filaments 20 are interwoven with the first and second filaments 14 and 18 in an over, under weave pattern.

As illustrated in FIG. 1, the first filaments 14 may comprise spaced parallel individual filaments or pairs of filaments spaced apart an equal distance from one another but all extending parallel to one another. Likewise, the second filaments 18 may be either single filaments or double filaments but in either event are spaced apart an equal distance from one another. FIG. 1 illustrates tows or groups 22 of individual filaments interwoven with the crisscrossing first and second filaments each being interwoven with the first and second filaments. Each tow of filaments includes a plurality of parallel individual filaments bunched together.

In accordance with the practice of this invention, the sleeve of FIG. 1 comprises criss-crossing interwoven elastic first and second filaments 14, 18 with interwoven tows 22 of inelastic filaments. The tows 22 are made of non-elastic reinforcing material such as kevlar, carbon, fiberglass or nylon. The non-elastic tows of filaments 22 contribute to the mechanical properties of the finished tubular part made from the sleeve, i.e. strength and stiffness. The elastic first and second filaments 14, 18 allow the sleeve to be expanded radially and return to their relaxed position, and may provide some degree of contribution to the mechanical properties of the finished part. This elastic characteristic of the first and second filaments to spring back to their original shape ensures a snug fit when the sleeve is placed over a mandrel having varying or alternatively larger/smaller/larger or smaller/larger/smaller cross-sections.

FIGS. 2–4 illustrate the method of manufacturing an article of manufacture made from the sleeve of FIG. 1. FIG. 2 illustrates a mandrel 24 generally in the shape of the article to be formed for example a tube scope to be mounted on a firearm. The mandrel 24 has two end sections 26, 28 of a relatively large diameter and a middle narrow section 30 having a much smaller diameter than the diameter of the two end sections 26, 28. In the middle of the middle section 30 is a cylindrical enlargement 32 of a larger diameter than the remainder of the middle section 30 but of a smaller diameter than the end sections 26, 28. Although one specific mandrel having cross-sections of differing diameters is illustrated many variations thereof may be used to form many different shaped parts, and so the present invention is not in any way limited to producing only the part illustrated herein.

FIG. 3A illustrates the sleeve of FIG. 1 being placed over from the mandrel of FIG. 2 from left to right in the direction of arrows 34. Due to the elastic nature of the first and second filaments 14, 18 of the braided sleeve 10, the sleeve may be radially expanded over the different portions of a mandrel and maintain a snug fit throughout the entire length of the mandrel. Portions of the sleeve not radially expanded retain their original diameter. As can be seen in FIG. 3B, the sleeve covers the entire length of the mandrel covering all portions of the mandrel. Upon placing the sleeve over the mandrel, the sleeve is heated and pressed or pressurized as is known in the art fusing the filaments of the sleeve together, by virtue of the filament having been pre-injected with resin or the like. After the sleeve is heated and pressurized, the sleeve is allowed to cool to room temperature before the mandrel is removed from the article of manufacture 36 by being deflated or collapsed or other conventional means known in the art. The result is a rigid tubular article of manufacture illustrated in FIG. 4. Again, the overall shape of the article of manufacture 36 is identical to the shape of the mandrel 24.

FIG. 5 illustrates an alternative tri-axial braided sleeve 40 having a longitudinal axis 42. This sleeve 40 comprises a plurality of first filaments 44 and a plurality of second filaments 46 interwoven with one another in an over/under configuration. The first filaments 44 extend at an angle alpha to the longitudinal axis 42 of the sleeve and the second filaments extend at an angle beta to the longitudinal axis 42 of the sleeve. The first filaments 44 may comprise individual filaments spaced from one another or two filaments side by side spaced from either single filaments or double filaments. The same is true with the second filaments 46. The first and second filaments 44, 46 are made of a non-elastic material such as kevlar, carbon or fibreglass. In addition, the sleeve 40 comprises a plurality of longitudinally extending filaments 48 which extend parallel to the longitudinal axis 42 of the sleeve. These filaments 48 are made of an elastic material which enable the sleeve 40 to be stretched longitudinally. When the sleeve 40 is in a stretched or "expanded" position, the longitudinal filaments 48 are in tension and the first and second filaments 44, 46 are contracted and upon release return to their normal position. The third filaments 48 may be grouped together in tows or bundles interwoven with the first and second filaments 44, 46 of the sleeve 40 in an over under pattern.

FIG. 6 illustrates the sleeve of FIG. 5 in its normal condition without the sleeve being stretched either longitudinally or radially.

FIG. 7 illustrates the sleeve 40 being stretched longitudinally so that the diameter of the sleeve D lessens and the length L of the sleeve increases.

The sleeve 40 of FIGS. 5–8 may be used to reinforce a cylindrical member or the juncture of two hollow pipes. As illustrated in FIG. 8, one end of a first pipe 56 is placed inside an end of a second pipe 58. The sleeve 40 is placed inside the juncture of the pipes in an expanded, stretched condition as illustrated in FIG. 7 such that the longitudinal filaments 48 of the sleeve are in tension and the diameter D of the sleeve 40 is less than when the sleeve is in a relaxed or normal condition.

As illustrated in FIG. 9, the sleeve 40 is radially expanded by releasing the tension on the longitudinal filaments 48 causing the longitudinal filaments 48 to return to their normal condition. This presses the exterior of the sleeve against the inner surface 60 of the two pipes 56, 58. The sleeve is then subjected to heat and pressure in order to fuse the filaments of the sleeve 40 together and upon cooling form a rigid reinforcing wall 64.

FIG. 10 illustrates a cross-sectional view illustrating the finished product 64 secured against the surface 60 by a collapsible fixture 59 in a position to reinforce the joint 65 between the first and second pipes 56, 58.

A further advantage of the present invention is that crimping, or out-of-plane undulations, of the reinforcement fibers, which is undesirable due to its detrimental effect on the mechanical properties (i.e. strength and stiffness) of the finished part, are minimized or eliminated since the elastic fibers or filaments are the ones, due to their elasticity, which crimp around and over the reinforcement filaments, with the reinfrocement filaments remaining essentially straight.

While we have described only two preferred embodiments of the present invention, those skilled in the art will appreciate changes and modifications which may be made without departing from the spirit of the invention. For example, the present invention is not limited to a tubular sleeve, nor to a method of making parts made therefrom, as the invention could take the form of a textile fabric as well as a method of making parts from the textile fabric. The textile fabric could take the form of a plurality of elastic filaments interwoven or interstitched with a plurality of non-elastic, reinforcement filaments such that the elastic filaments crimp and stretch when the fabric is conformed to a surface of mold while the reinforcement filaments do not crimp or stretch but lie parallel a plane of the mold surface. Therefore, we do not intend to be limited except by the scope of the following appended claims:

What is claimed is:

1. A triaxial woven sleeve from which to make a rigid, tubular article of manufacture, said sleeve having a longitudinal axis, said sleeve comprising:

a plurality of first filaments extending in a first direction, said first filaments being elastic and said first direction being at an angle to said longitudinal axis, a plurality of second filaments extending in a second direction, said second filaments being elastic said second direction being at an angle to said longitudinal axis, and being different than said first direction, said first and second filaments being interwoven with one another, and a plurality of reinforcement filaments extending parallel to said longitudinal axis, said reinforcement filaments being interwoven with said first and second filaments and being generally inelastic when under tension relative to said first filaments and said second filaments.

2. A method of forming a rigid, tubular article of manufacture of varying cross sections, said method comprising the steps of:

providing a tubular woven sleeve having a longitudinal axis, a plurality of first filaments being elastic and extending in a first direction, said first direction being at an angle to said longitudinal axis, a plurality of second filaments being elastic and extending in a second direction different than said first direction and a plurality of reinforcement filaments extending generally parallel to said longitudinal axis, said reinforcement filaments being generally inelastic when under tension relative to said first filaments and said second filaments, providing a mandrel having the same general shape as the article of manufacture, stretching the sleeve over the mandrel, subjecting the sleeve to heat and pressure, allowing the sleeve to cool into the rigid, tubular article of manufacture, and removing the article from the mandrel.

3. An article of manufacture made according to the method of claim 2.

4. The article of claim 3 wherein the article of manufacture is a scope tube for a firearm.

5. The method of claim 2, said method further comprising the step of:

providing a mandrel having at least two sections of a fixed diameter, one section being from a lesser diameter than the diameter of the other section.

6. The method of claim 5 wherein the step of subjecting the sleeve to heat and pressure fuses the filaments together.

7. An article of manufacture made according to the method of claim 5.

8. The article of claim 7 wherein the article is a scope tube for a firearm.

9. A rigid, tubular article of manufacture comprising:

a triaxial woven sleeve comprising:

a plurality of crisscrossing interwoven bias filaments being elastic and extending in directions angled to said longitudinal axis, and a plurality of reinforcement filaments extending parallel to said longitudinal axis and being interwoven with said bias filaments, said reinforcement filaments being generally inelastic when under tension relative to said bias filaments, said sleeve being rigidified into said rigid, tubular article by heating said sleeve and applying pressure through the thickness of the sleeve.

10. The article of claim 9 wherein said non-elastic filaments are made of reinforcement material.

11. The article of claim 10 wherein the reinforcement material is selected from the group consisting of carbon, nylon, fiberglass and kevlar.

12. A method of reinforcing a rigid, tubular article of manufacture having inner and outer walls with a woven sleeve, said method comprising the steps of:

providing a tubular woven sleeve having a longitudinal axis which is longitudinally elastically expandable and contractible, said sleeve being radially contracted hen longitudinally expanded and radially expanded when longitudinally contracted, placing the sleeve inside the tubular article while the sleeve is longitudinally expanded and radially contracted based on tension applied to the sleeve along the longitudinal axis, allowing the sleeve to longitudinally contract and radially expand so as to conform to the inner wall of the article by releasing the tension along the longitudinal axis, and subjecting the sleeve to the heat and pressure to fuse the sleeve to the inner wall of the article.

13. The method of claim 12 wherein said sleeve comprises a plurality of elastic filaments generally parallel said longitudinal axis.

14. A rigid, tubular article of manufacture reinforced according to the method of claim 12.

15. The article of claim 14 wherein said article is a pipe joint.

16. A triaxial woven sleeve according to claim 1, wherein each of said axial reinforcement strands is of a material selected from the group consisting of fiberglass, carbon, aramid and mixtures of hybrids thereof.

* * * * *